United States Patent [19]
Wenger et al.

[11] Patent Number: 5,542,309
[45] Date of Patent: Aug. 6, 1996

[54] GEARBOX

[75] Inventors: Urs Wenger; Hans R. Jenni, both of Langenthal; Andreas Wüthrich, Niederscherli, all of Switzerland

[73] Assignee: SMH Management Services AG, Biel, Switzerland

[21] Appl. No.: 335,364

[22] Filed: Nov. 3, 1994

[30] Foreign Application Priority Data

Nov. 18, 1993 [FR] France .................................... 93 13768

[51] Int. Cl.⁶ .................................................. F16H 63/00
[52] U.S. Cl. ............................. 74/337.5; 74/357; 74/362; 74/372
[58] Field of Search ..................... 74/337.5, 329, 74/344, 357, 362, 372, 335, 474

[56] References Cited

U.S. PATENT DOCUMENTS

| | | | |
|---|---|---|---|
| 3,696,686 | 10/1972 | Steele | 74/337.5 |
| 3,954,021 | 5/1976 | Mraz | 74/337.5 X |
| 4,409,857 | 10/1983 | Lason | 74/337.5 |
| 4,409,858 | 10/1983 | Lason | 74/337.5 |
| 4,483,210 | 11/1984 | Mayuzumi | 74/329 X |
| 4,656,882 | 4/1987 | Kerr | 74/337.5 |
| 4,713,979 | 12/1987 | Muto et al. | 74/337.5 |
| 5,363,712 | 11/1994 | Müller | 74/337.5 |
| 5,365,800 | 11/1994 | Müller | 74/337.5 |

FOREIGN PATENT DOCUMENTS

| | | |
|---|---|---|
| 952600 | 11/1956 | Germany . |
| 4205670 | 6/1993 | Germany . |

OTHER PUBLICATIONS

Patent Abstracts of Japan, vol. 6, No. 260 (M–180) (1138) 18 Dec. 1982 & JP-A-57 154 548 (Kawasaki Jukogyo) 24 Sep. 1982.
Patent Abstracts of Japan, vol. 12, No. 437 (M–765) 17 Nov. 1988 & JP-A-63 172 045 (Kikuzawa Hiromasa) 15 Jul. 1988.

*Primary Examiner*—Rodney H. Bonck
*Assistant Examiner*—Peter Kwon
*Attorney, Agent, or Firm*—Griffin, Butler, Whisenhunt & Kurtossy

[57] ABSTRACT

This gearbox whose arrangement is derived from that of motorcycle gearboxes, comprises organs according to the invention enabling it to be adapted, in particular for a motor vehicle.

The selector shaft (10) which ensures the ratio shift by means of forks (29, 30, 31) may be decoupled from the latter thanks to a decoupling shaft (11) which disengages the counter-cams forming one piece with the forks from their respective cams provided on the selector shaft (10).

One can thus select any ratio shift without having to shift through the intermediate ratios.

11 Claims, 16 Drawing Sheets

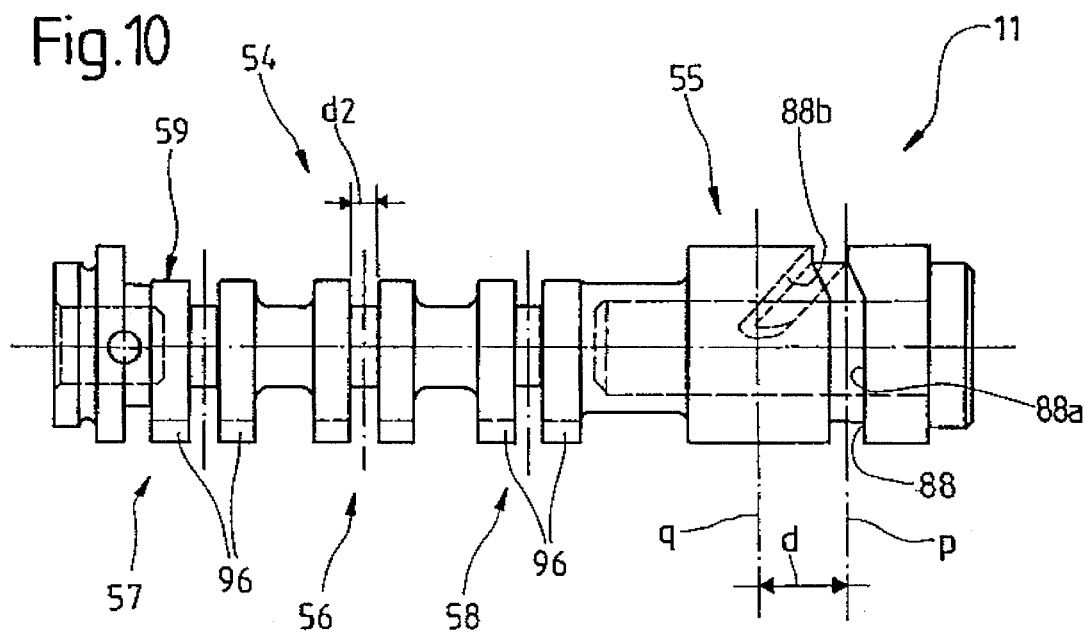
Fig.10
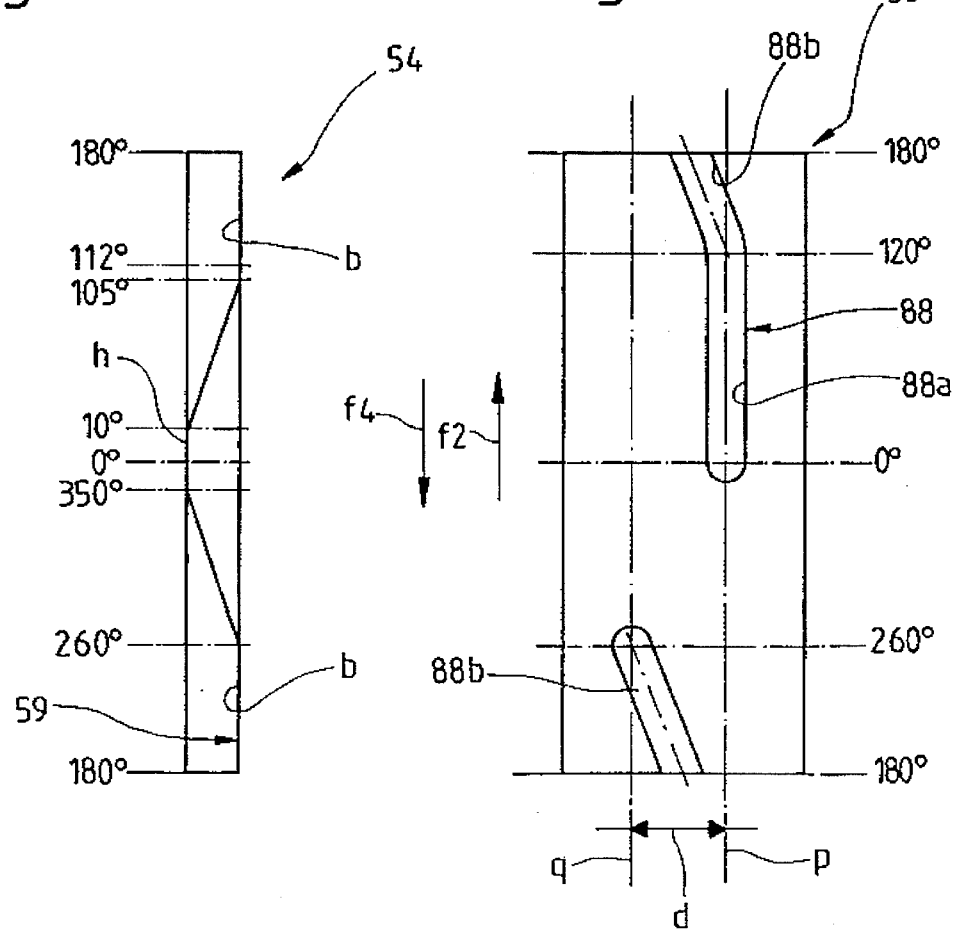
Fig.12
Fig.11

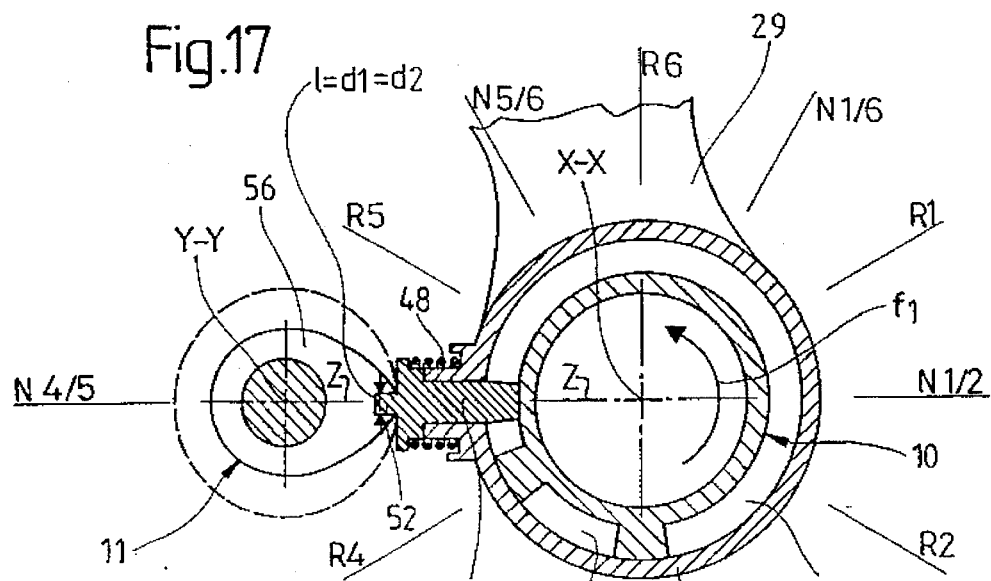
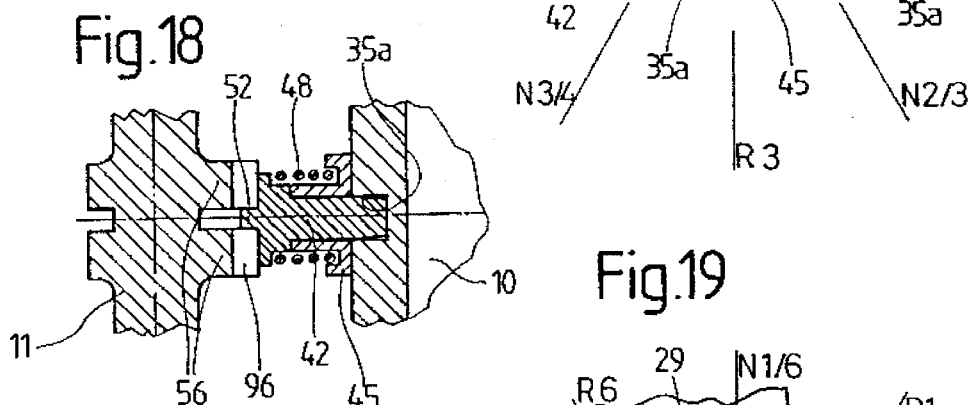
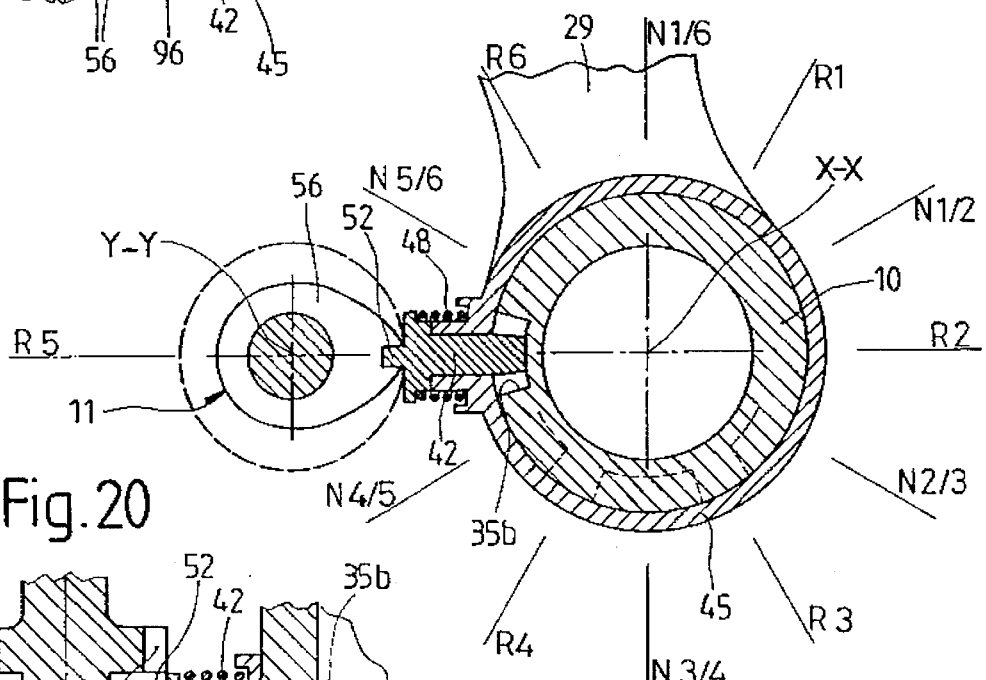
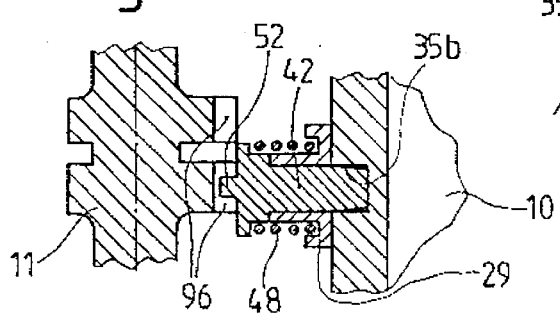

GEARBOX

The present invention relates to a gearbox intended notably to be mounted at the output of an internal combustion engine whose maximal torque is provided at a relatively high rate (of the order of 3000 rpm for example).

When an internal combustion engine is devised to operate with a maximal torque at relatively high rate, it is desirable for the gearbox which is coupled to it to also have a relatively high number of transmission ratios. This is the case for example for motorcycles whose gearboxes generally have six ratios. In order to make the gearbox as light and simple as possible it is also usual to construct it without a synchronizing device.

Moreover, a motorcycle gearbox is generally controlled by foot by the intermediary of a gear-shift pedal which enables the gears of the box to be selected only in a rising or descending sequence without the motorcyclist being able freely to select a given gear directly from the gear in which, at a given moment, the gearbox is placed.

These particular characteristics of motorcycle gearboxes make them ill suited to equip motor vehicles, which is in principle unfortunate, since their lightness and simplicity of design are properties which would be desirable to be able to exploit in motor vehicles, especially in those which are of a small size and intended for town use.

The principal aim of the present invention thus consists of providing a gearbox designed according to the principles of a motorcycle gearbox, but especially adapted for use in a motor vehicle, in particular in a vehicle whose driving motor has its maximal torque at relatively high rate.

The invention thus concerns a gearbox comprising:

a primary shaft intended to be coupled to a power supply;

a secondary shaft intended to be coupled to a power outlet;

a plurality of sets of gearwheels assembled on said primary and secondary shafts, said sets of gearwheels being able to be selectively meshed to establish a plurality of transmission ratios between said supply and said outlet;

said sets of gearwheels comprising a plurality of switching gearwheels for said ratios, said gearwheels being assembled so as to move in the axial direction on said shafts to enable said ratios to be established;

selection means coupled to said switching gearwheels to cause them to make the appropriate axial movements according to the desired transmission ratio;

said selection means comprising a ratio selector shaft rotationally mounted so as be able to exhibit at least as many selecting positions as there are possible transmission ratios, said selector shaft being therefore provided with cam forming means coupled to said switching gearwheels through the intermediary of counter-cam forming means;

said gearbox being characterised in that it also comprises: decoupling means for selectively disabling the coupling between each cam forming means and each counter-cam forming means associated with it, in order to enable the free rotation of said selector shaft towards any ratio selecting position, whatever the previously selected transmission ratio.

Due to these characteristics, it becomes possible to choose, without activating the switching gearwheels, to shift from one transmission ratio to any other transmission ratio instead of having to select one after the other the ratios situated between the present ratio and the newly selected ratio.

Thus, despite the relatively high number of possible ratios, the gearbox according to the invention has a low rate of wear and a great ratio shifting speed. It is thus particularly well suited to being adapted to a motor whose maximal torque is at relatively high rate and which requires a gearbox having a large number of ratios. As such a motor is of light construction, a motor assembly comprising it in conjunction with a gearbox according to the invention, may advantageously equip a vehicle of limited size suitable, in particular, for town use.

According to another characteristic of the invention, the gearbox comprises means for ensuring automatic control of the selector shaft and means enabling the cam forming means and counter-cam forming means used with this selector shaft to be decoupled.

It has been confirmed that the fact of being able to cut off the mechanical connection between the selector shaft and the switching gearwheels, makes the gearbox according to the invention particularly appropriate to being automatized. This advantageous characteristic makes this gearbox even more attractive for equipping a small town vehicle without the cost price and mechanical complexity of such vehicle being adversely affected.

In an advantageous manner, said decoupling means comprise a rotationally mounted decoupling shaft parallel to said selector shaft, said decoupling shaft being equipped with at least one cam per counter-cam forming means which said selector shaft has, each of said decoupling cams being assembled in such a way as to enable said counter-cam forming means to be disengaged from its associated cam forming means.

This particular characteristic enables all ratio shifts to be made automatic, including those which jump several intermediate ratios, without complicating the arrangement of the gearbox to a great extent.

According to another characteristic of the invention, said decoupling shaft is provided with means for controlling the shift into reverse gear, the gearbox also comprising reverse gearwheels used with said primary and secondary shafts and reverse switching gearwheels assembled in such a way that they can be controlled by said reverse gear control means.

The invention also concerns a power unit intended more particularly to equip a motor vehicle and comprising, an assembly of a driving motor, a gearbox such as that described above coupled to said motor, as well as a starter mechanism equipped with a starter motor, this power unit being characterised in that said starter motor is coupled so as to enable said driving motor to be started selectively and to be used as driving organ for said selector shaft and said coupling means.

Other characteristics and advantages of the present invention will appear upon reading the following description, which is given solely by way of example and is made with reference to the attached drawings in which:

FIG. 5A is a cross-sectional view of a detail of the arrangement of the gearbox;

FIG. 5B is a large scale facing view of a counter-cam used in the ratio shifting control unit;

FIG. 10 is an external view of a decoupling shaft enabling a free selection of the forward and reverse ratios;

FIG. 11 is a view unrolled into one plane showing the profile of a cam groove of the decoupling shaft of FIG. 10, this groove being intended to ensure the reverse gear selection of the gearbox;

FIG. 12 shows, unrolled into one plane, the profile of the three pairs of cams arranged on the decoupling shaft shown in FIG. 10;

FIGS. 17 to 25 illustrate, by radial cross-sectional views the relative positions of the ratio selection control shaft and the decoupling shaft and the reverse gear control, during several essential phases of the operation of the gearbox according to the invention.

Figure 1:
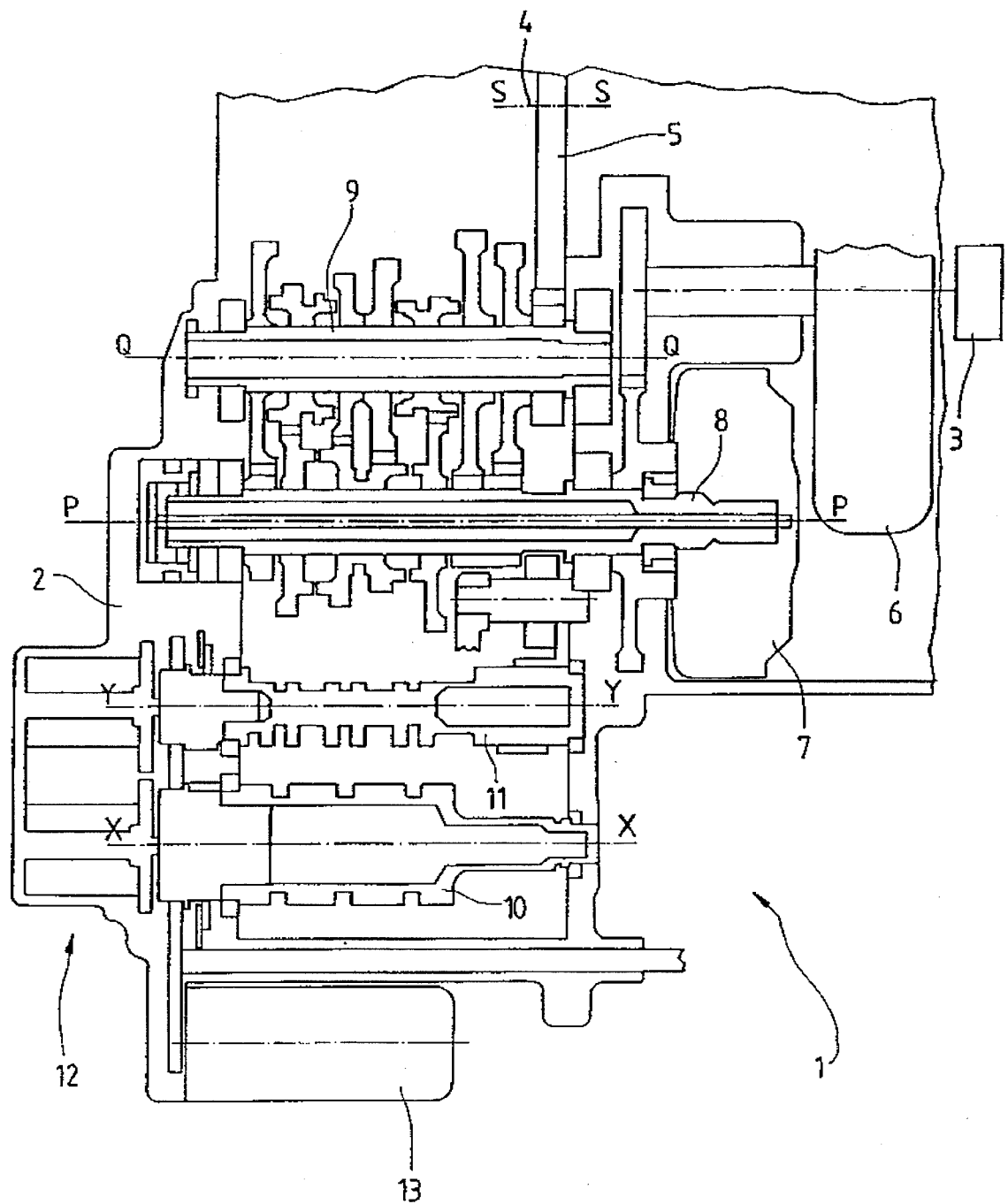
FIG. 1 is a schematical view of the preferred embodiment of the gearbox according to the invention, showing the general arrangement of the essential organs of said gearbox.

Reference will be made first of all to FIG. 1 which shows schematically the essential organs of the gearbox according to the invention.

The automatic gearbox according to the invention is generally designated by the reference 1. It is housed in a casing 2 and intended to ensure, with a variable transmission ratio, the transmission of a rotating movement originating from a driving motor symbolized by the box 3 to an outlet shaft 4 symbolized by the axis S—S of an outlet cogwheel 5. Driving motor 3 may be, for example, an internal combustion engine.

The kinematic chain interposed between driving motor 3 and outlet shaft 4 includes in succession: a torque converter 6, a clutch 7, a primary shaft 8, of axis P—P, and a secondary shaft 9, of axis Q—Q.

Gearbox 1 also comprises a shaft 10 or selector shaft, of axis X—X, for the control of ratio selection, a shaft 11 or decoupling shaft, of axis Y—Y, for the control of free selection of reverse motion and ratios, a control unit 12 of the two shafts 10 and 11 and a control motor 13.

Figure 2:
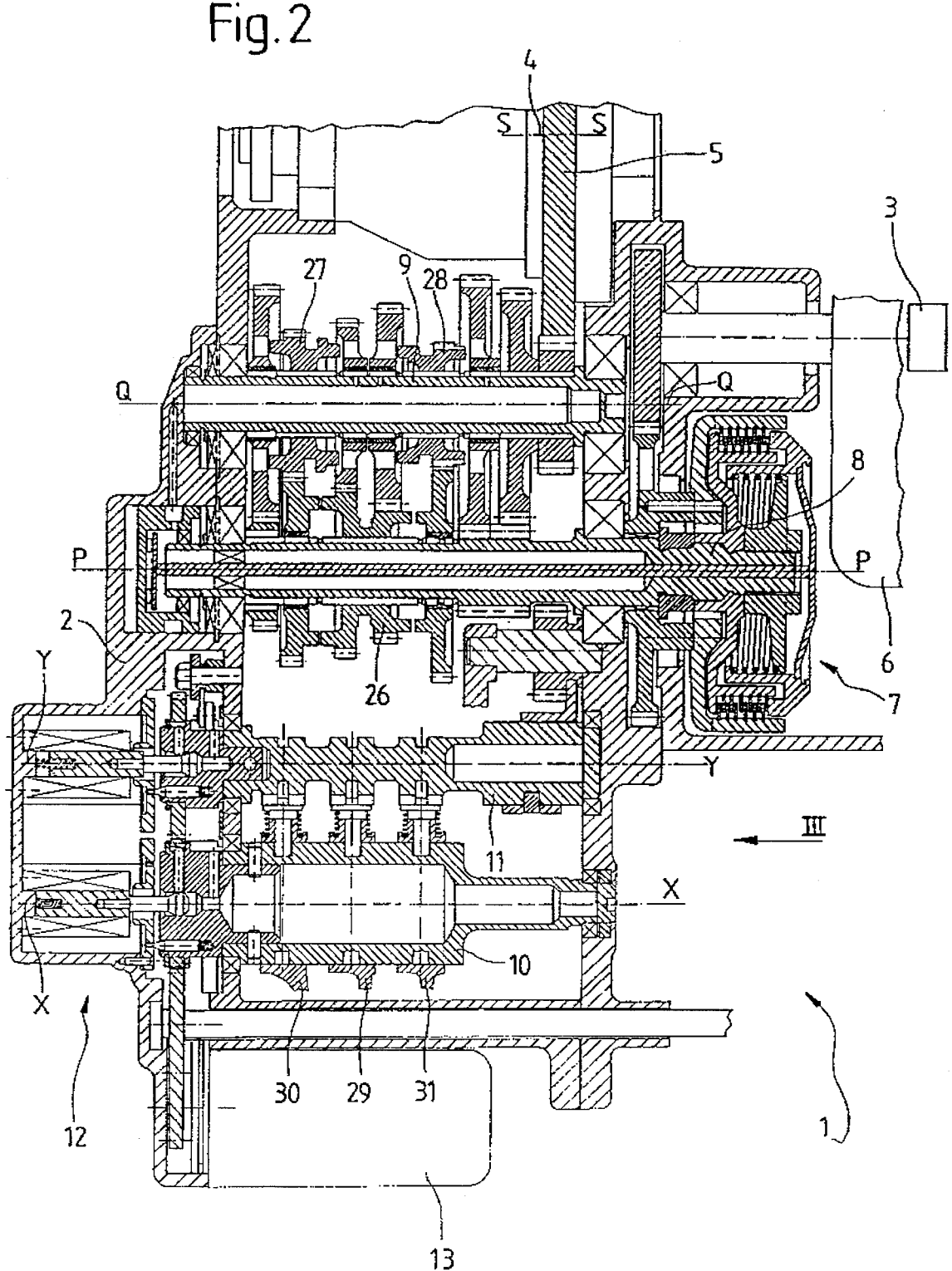
FIG. 2 is a cross-sectional view of the gearbox according to the invention, showing in more detail its essential organs, the view being taken along the broken cross-sectional line II—II of FIG. 3.
Figure 3:
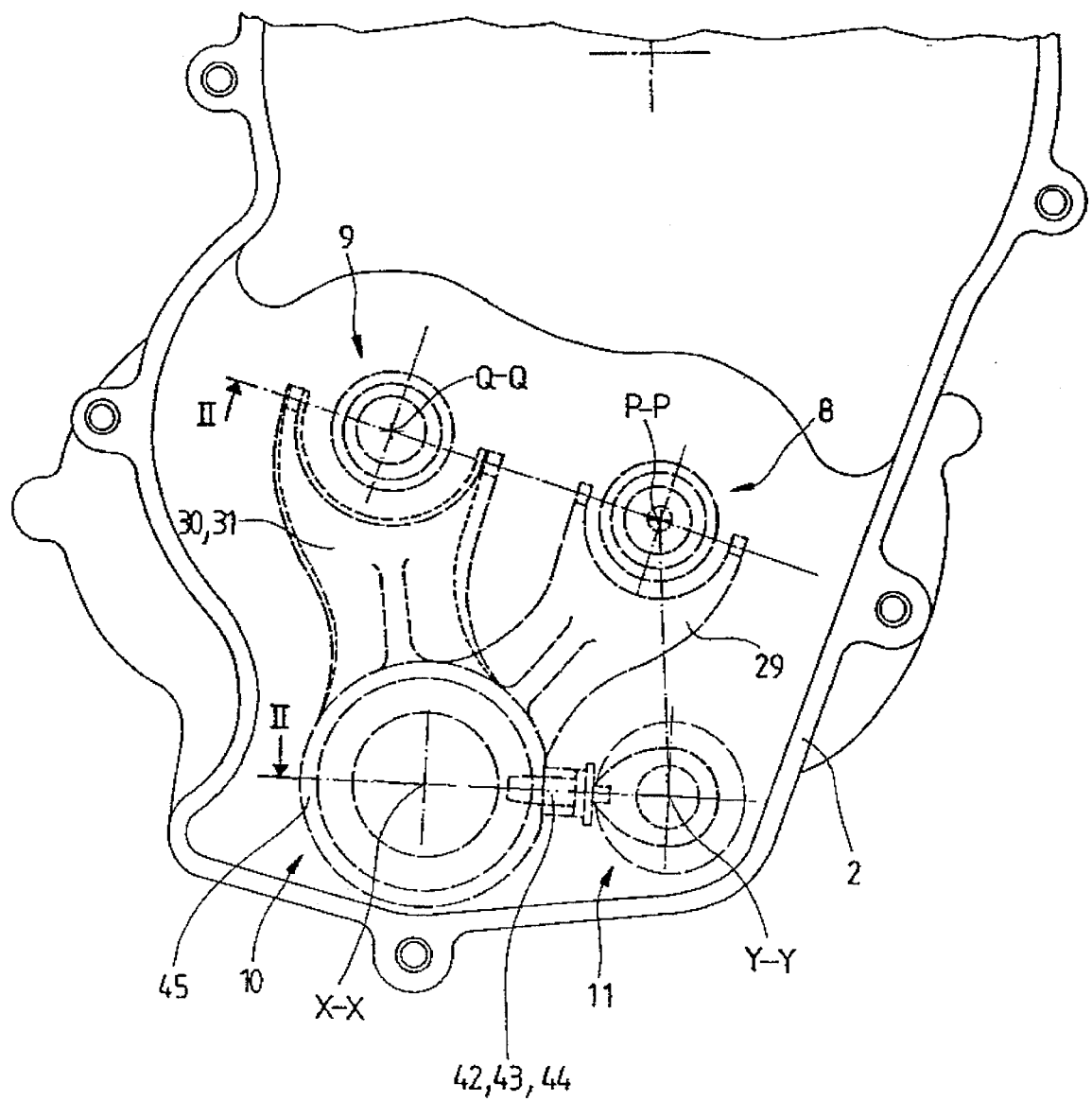
FIG. 3 is a partial side view of the gearbox.

An examination of FIGS. 2 and 3 shows the spatial arrangement of the axes of the various gearbox organs, FIGS. 1 and 2 showing a cross section along the broken cross-sectional line II—II of FIG. 3.

The arrangement of the example of the gearbox according to the invention, shown in the drawings, is derived from those of the gearboxes usually used for motorcycles.

This arrangement, which is known, has been used in the gearbox according to the invention in relation to the actual gear shift unit comprising in particular primary shaft 8 and secondary shaft 9, as well as the cogwheels, pinions and selector rods which are used with these shafts. The same is true for selector shaft 10. In a motorcycle, this selector shaft is conventionally activated by foot by the motorcyclist by the intermediary of a catch mechanism.

On the other hand, the arrangement of the gearbox according to the invention differs notably from this conventional arrangement in that it comprises means enabling it to be automatically controlled, in that the ratios may be selected in any order and in that the ratio shift automatic control unit has an original arrangement.

Consequently, referring now more particularly to FIG. 4, a brief description will be given of the conventional part of the gearbox which ensures the actual ratio shifts, followed by a detailed description, with the aid of the other drawings, of the particular original characteristics comprising the gearbox according to the invention.

Figure 4:
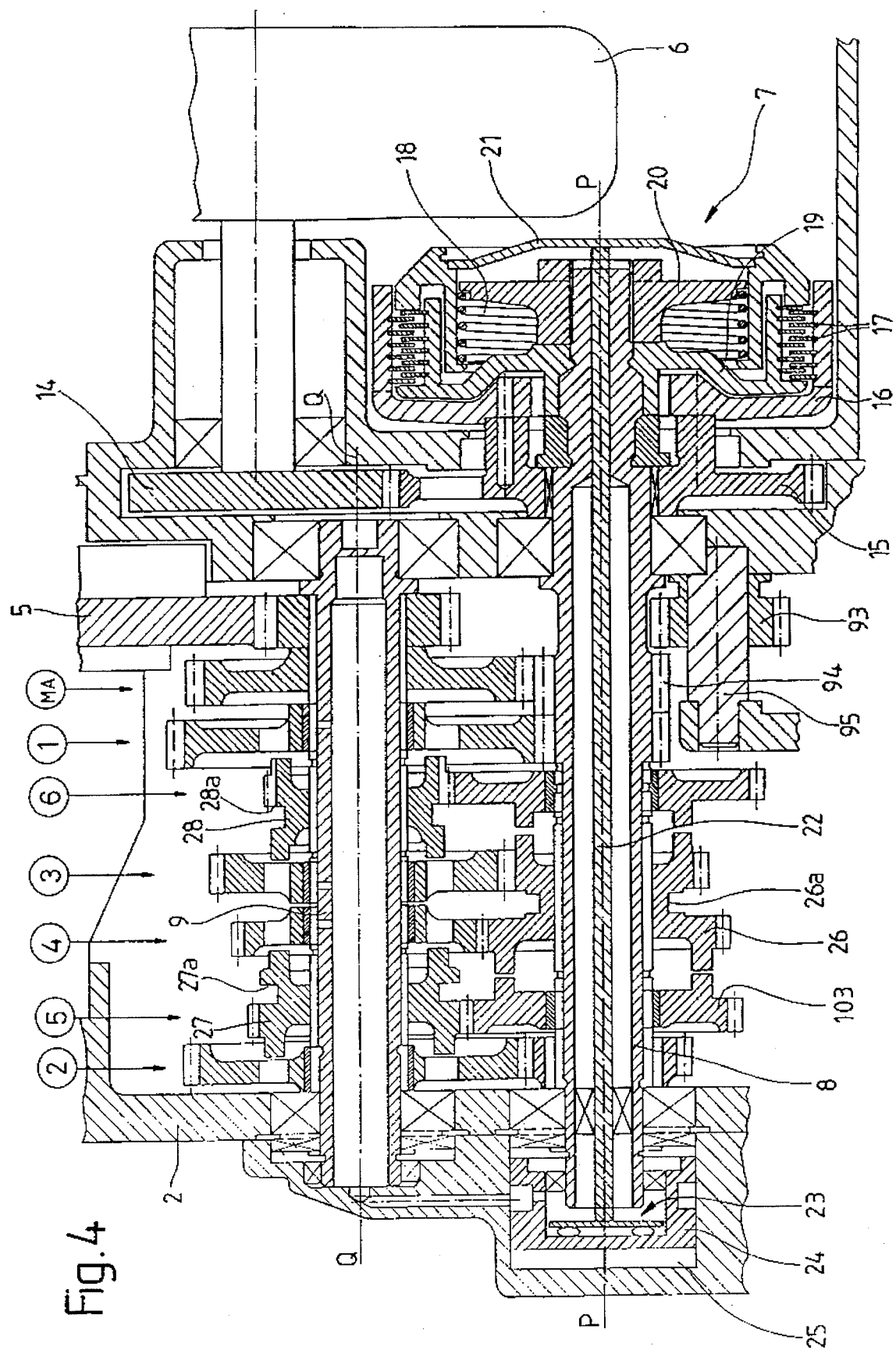
FIG. 4 is a cross-sectional view, to a larger scale than FIGS. 1 to 3, of the ratio shifting unit of the gearbox according to the invention.

It should however be noted that FIG. 4 shows torque converter 6 and automatically controlled hydraulic clutch 7, organs which a motorcycle gearbox does not conventionally include.

Torque converter 6 is coupled to a pair of cogwheels 14 and 15, cogwheel 15 forming one rotating piece with bell 16 of clutch 7.

In the case shown, this clutch is of the type with multiple friction rings 17 capable of being pressed against each other by a clutch spring 18 by the intermediary of a plate 19 and a ferrule 20.

Friction rings 17 may be loosened thanks to a clutch disc 21 which forms one piece with plate 19. This disc is in contact with a pusher 22 driven into primary shaft 8 which it transverses right through. At its opposite end, pusher 22 abuts on a needle stop 23 forming an axial bearing and mounted in a hydraulic control piston 24. The latter may slide into a chamber 25 arranged in casing 2 of gearbox 1.

Thus, it can be seen that primary shaft 8 may be decoupled from torque converter 6, by placing chamber 25 under pressure, the coupling, on the other hand, being achieved by releasing the pressure in said chamber, the spring 18 thus ensuring the coupling.

In the example described, gearbox 1 has six speed ratios which are obtained by selectively activating selector rod 26 which is mounted on primary shaft 8 and two selector rods 27 and 28 mounted on secondary shaft 9. These selector rods may, in the conventional manner, slide on their respective holding shaft whilst being rotationally coupled to the latter, thanks to the appropriate splines. They co-operate with straight clutch pinions (not referenced) ensuring, by being adequately meshed, the speed ratios indicated by the FIGS. 1 to 6 in the small circles above secondary shaft 9 in FIG. 4. A set of gearwheels is also provided for reverse motion, indicated by MA, the embodiment example described here being particularly appropriate for use with a motor vehicle. Of course, the addition of reverse motion is itself also a characteristic of the present invention, in comparison to known motorcycle gearboxes.

Figure 5:
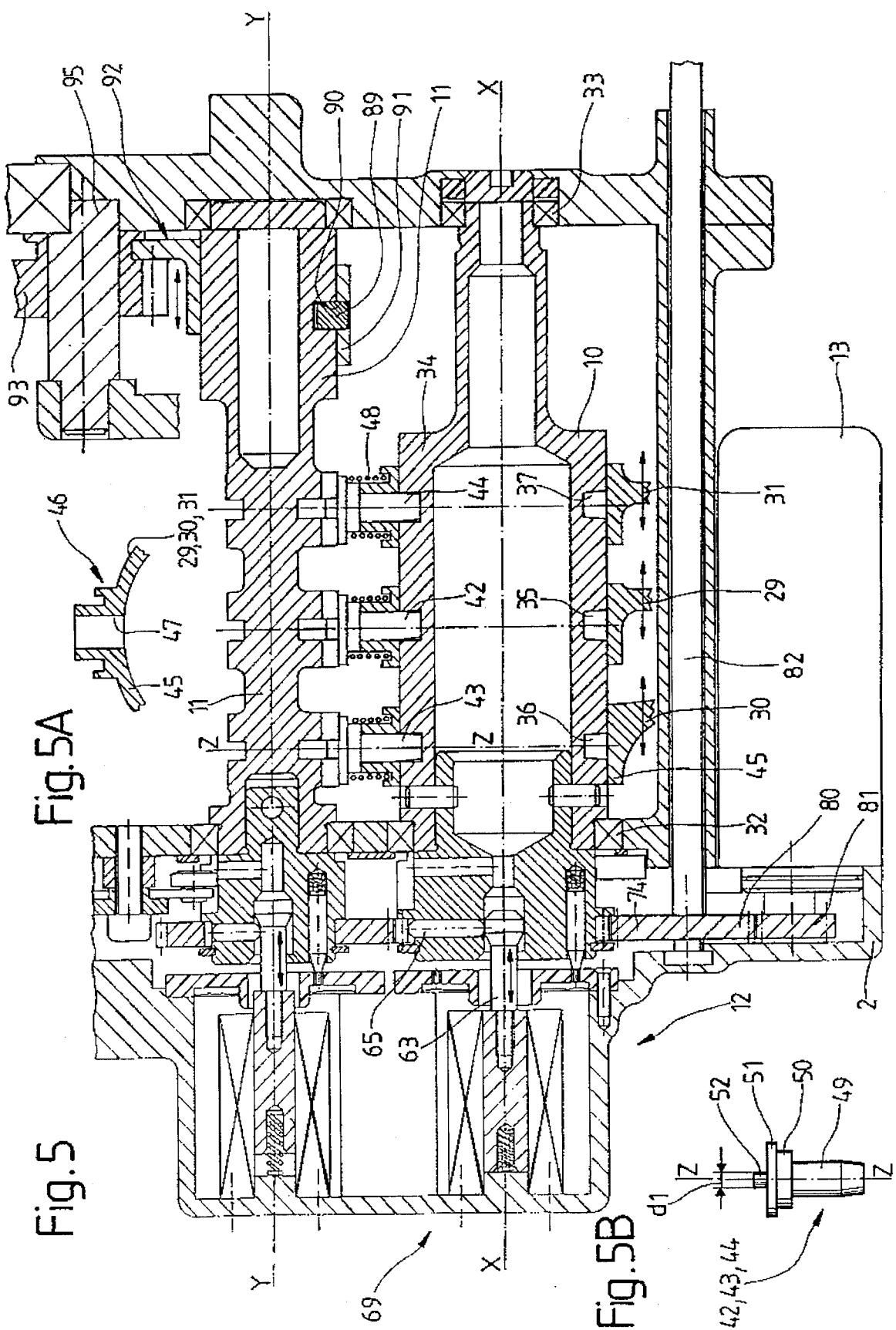
FIG. 5 is a cross-sectional view, to the same scale as FIG. 4, of the ratio shifting control unit of the gearbox.

As can be seen more particularly in FIGS. 2, 3 and 5, selector rods 26, 27 and 28 co-operate with forks 29, 30 and 31 which are rotationally mounted on ratio selection control shaft 10. Forks 29, 30 and 31 are also mounted so as to move in translation on said shaft 10 between two ratio engaging positions situated on either side of a neutral position. Said forks 29, 30 and 31 are meshed with the respective selector rods by the instrumentality of annular grooves 26a, 27a and 28a respectively cut inside said selector rods (FIG. 4).

Figure 8:
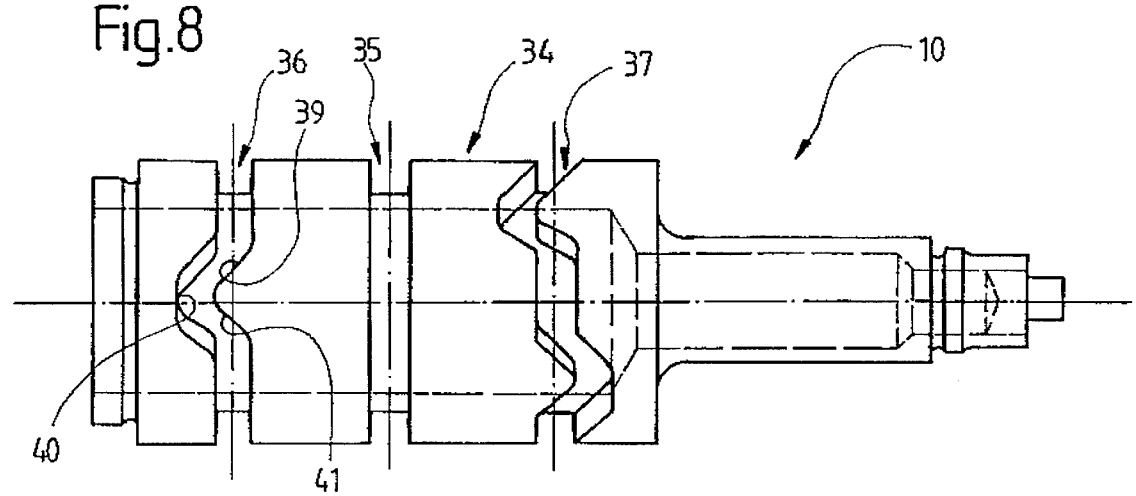
FIG. 8 is an external view of a ratio selection control shaft.
Figure 9:
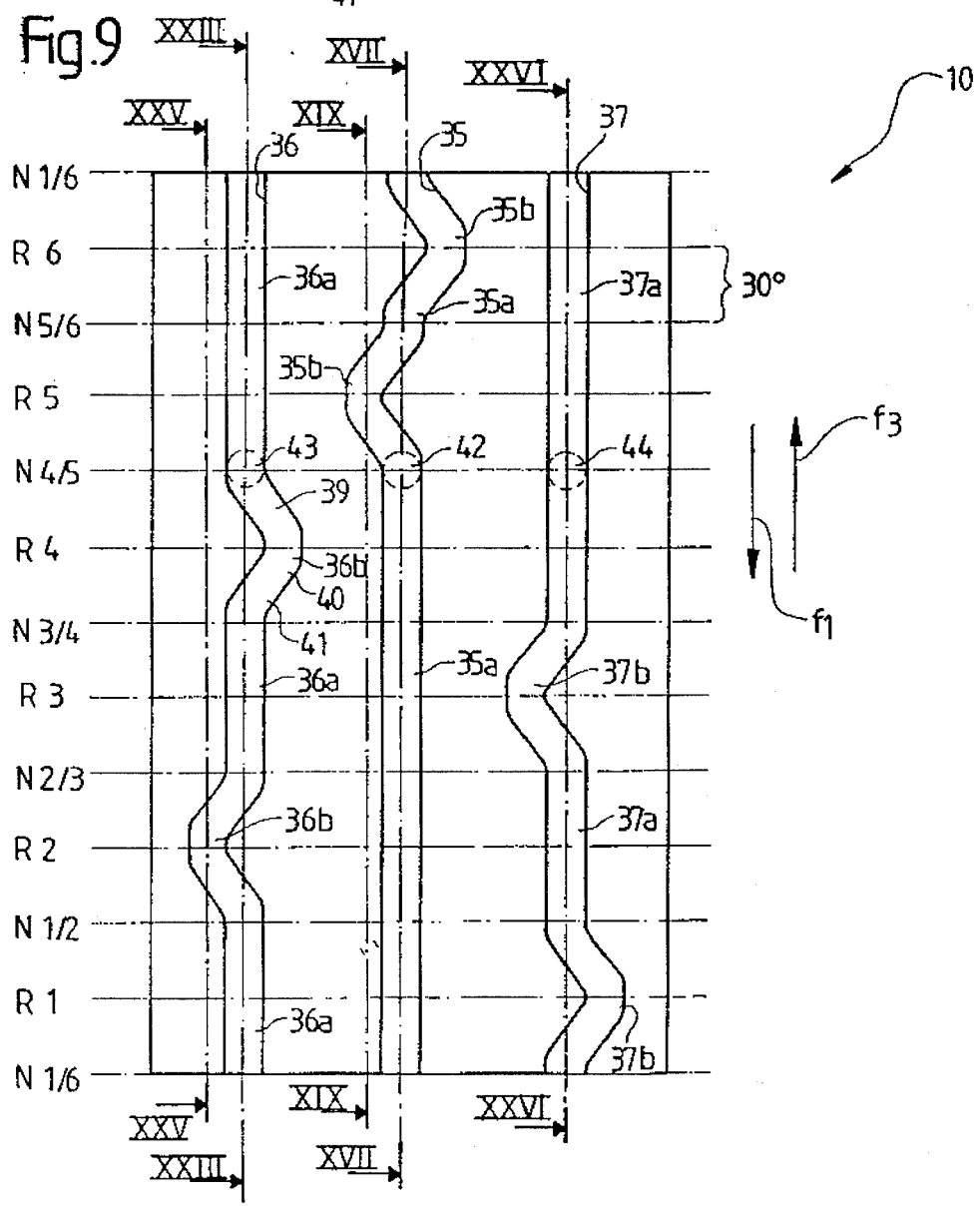
FIG. 9 is a view unrolled into one plane showing the profiles of the cam grooves of the ratio selection control shaft shown in FIG. 8.

FIGS. 8 and 9 show more particularly ratio selection control shaft 10.

This shaft has the form of a hollow cylinder rotationally suspended in casing 2 by means of bearings 32 and 33 (FIG. 5). In one cylindrical part 34 of said shaft of a wider diameter, are cut three cam grooves 35, 36 and 37 whose profiles appear clearly in FIG. 9. The latter figure also shows that shaft 10 has twelve positions indicated respectively by dotted lines and staggered in relation to each other at an angle of 30°. These positions correspond alternatively to a neutral position N in which no ratio is selected and to one of the six transmissions ratios 1 to 6.

Groove 35, placed between grooves 36 and 37, is intended to cause the axial displacement of selector rod 26 in one direction or the other enabling the fifth or sixth gears to be engaged. Similarly, groove 36 enables selector rod 27 to be displaced to engage the second and fourth gears. Groove 37 in turn is intended to engage the first and third gears.

The profile of each of grooves 35, 36 and 37 comprises, considered in a circumferential direction, one or more neutral sections, respectively 35a, 36a and 37a as well as two control sections, respectively 35b, 36b and 37b.

Each control section is formed of an oblique section 39, a "high" bearing 40 and another oblique section 41. High bearings 40 correspond to the engagement of a gear by the instrumentality of the respective selector rod; neutral sections 35a maintain the corresponding bearing in its inactive position.

Each cam groove 35, 36 and 37 of shaft 10 co-operates with a respective counter-cam 42, 43 and 44 which is radially engaged in the eye 45 of corresponding forks 29, 30 and 31. The ring which forms the eye of each fork includes a lateral protruberance 46 (FIG. 5A) pierced by an aperture 47 adjusted to the diameter of the counter-cam 42, 43 or 44 which is intended to be engaged with it. The base of each protuberance 46 assumes the form of an annular basin intended to provide support to a release spring 48. This spring pulls the corresponding counter-cam radially outwards in relation to ring 45 which forms the eye of the fork.

In fact, according to an essential characteristic of the invention, counter-cams 42, 43 and 44 are mounted so as to move radially along axis Z—Z in relation to shaft 10 so that the co-operation between each counter-cam and its cam groove may be momentarily suspended.

Each counter-cam 42, 43 and 44 includes (FIG. 5B) an axial guiding part 49 along axis Z—Z, the free end of such part being inserted into the groove of shaft 10, an assembly part 50 of spring 48, a radial shoulder 51, and a guiding snug 52 whose function will be described below.

As can be seen in FIG. 10, shaft 11 which is suspended in bearings 53 and 54 as shown in FIG. 5, has an eccentric part 54 and a reverse control part 55 described below.

Eccentric part 54 comprises three pairs 56, 57 and 58 of cams which co-operate with counter-cams 42, 43 and 44. Radial shoulder 51 of each counter-cam is maintained elastically against the peripheral surface 59 of each cam by the associated spring 48. As a result, counter-cams 42, 43 and 44 may simultaneouly leave the groove provided for them in shaft 10 by the rotation of shaft 11 at a certain angle.

Although the gearbox according to the invention may receive manual control elements such as, in the style of those conventionally found in motorcycles, catch mechanisms and cranks, to control shafts 10 and 11, the invention proposes to make this control entirely automatic by providing these two shafts with electromagnetic controls. A man skilled in the art will understand the devices necessary to provide these electromagnetic controls with the appropriate signals for the faultless operation of the gearbox, devices which will receive the control parameters relating to the motion of the vehicle, for example.

Figure 7:
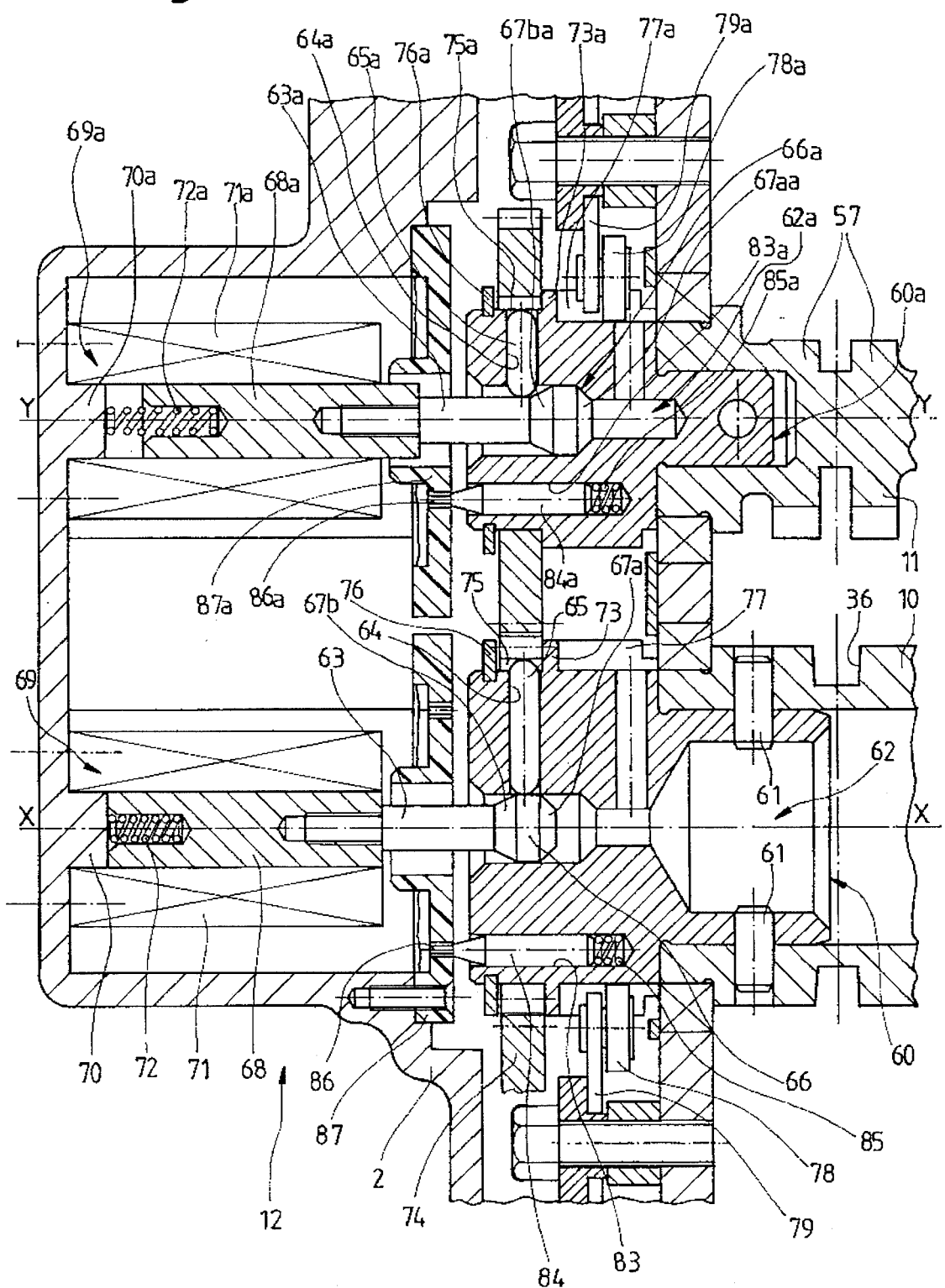
FIG. 7 is a cross-sectional view, to the same scale as that of FIG. 6, of one part of the gearbox ratio shifting control unit.
Figure 13:
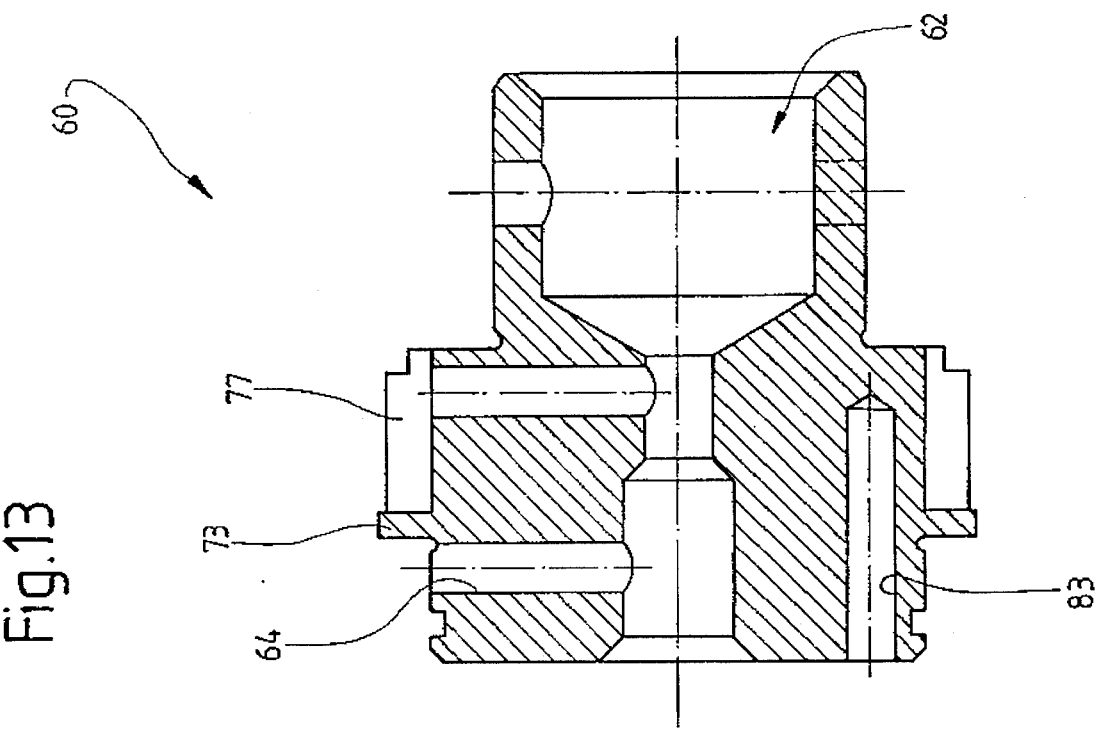
FIG. 13 is a cross-sectional view, to the same scale as that of FIG. 7, of a driving organ used with the ratio selection control shaft shown in FIG. 8.
Figure 14:
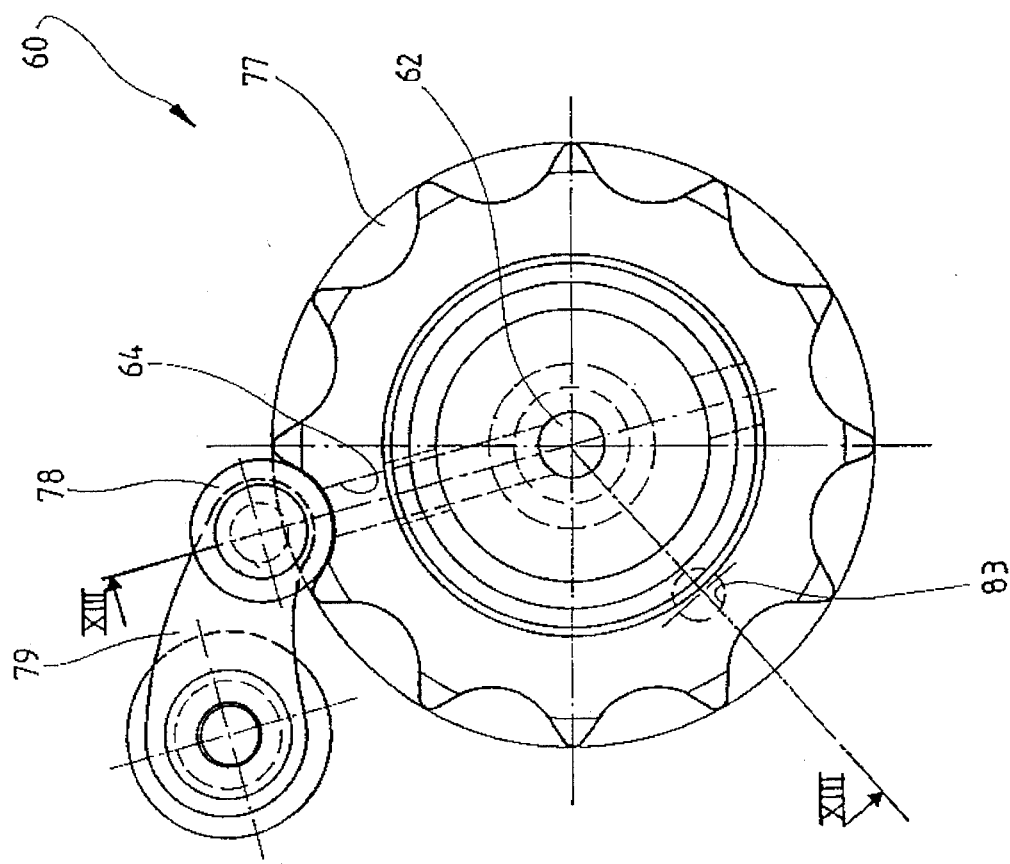
FIG. 14 is an end view of the driving organ of FIG. 13, also showing a counter-cam co-operating with the latter.
Figure 15:
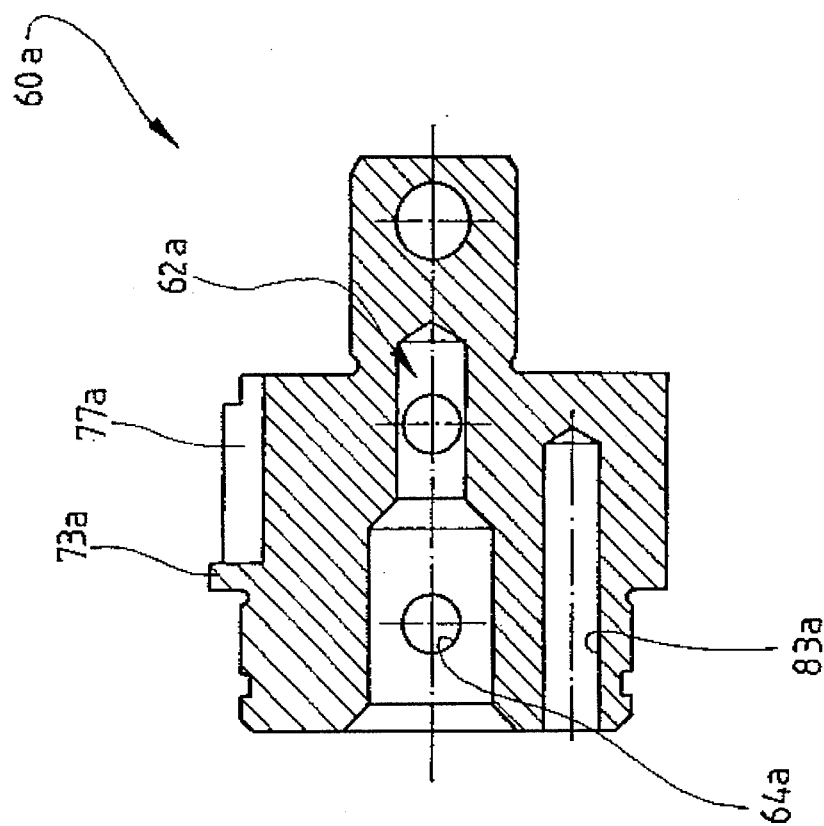
FIG. 15 is a cross-sectional view, to the same scale as that of FIG. 13, of a driving organ used with the decoupling shaft and reverse gear control shown in FIG. 10.
Figure 16:
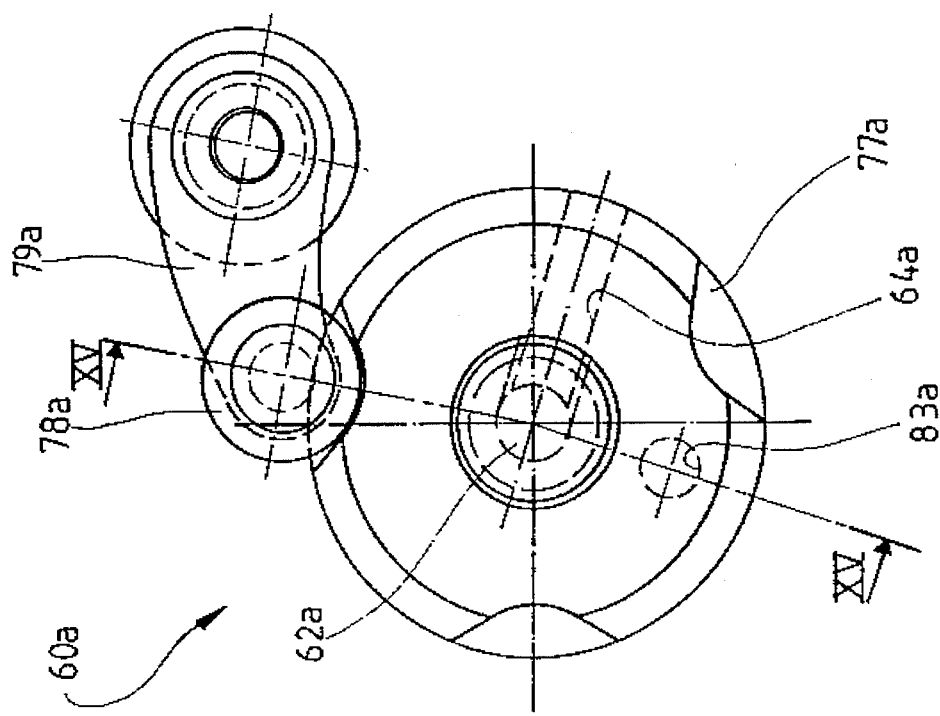
FIG. 16 is an end view of the driving organ of FIG. 15, the view also showing the counter-cam which co-operates with the latter.

Shaft 10 rotationally coupled with driving organ 60 (FIGS. 7, 13 and 14) by the instrumentality of two pins 61. This driving organ has a general cylindrical form centred on the axis X—X. Driving organ 60 has a path 62 concentric to this axis, of which the part situated at the opposite end to shaft 10 forms a guide for a coupling pusher 63. A radial hole 64 opens into path 62 and is used to guide a pin 65 able to move radially whose length is slightly greater than that of hole 64. The pin has hemispherical ends. It can be led into a position in which it passes beyond the external opening of hole 64.

Coupling pusher 63 has the form of a rod comprising a widened head 66 situated between two truncated parts 67a and 67b having opposite vertex. The diameter of widened head 66 is adjusted to that of path 62. The opposite end of coupling pusher 63 is screwed into the core 68 of a magnet 69 whose armature 70, which is protected by its coil 71, is fixed inside casing 2. A spring 72 is arranged inside core 68 resting upon armature 70; it pulls shank 68 out of armature 70 by driving coupling pusher 63. The excitation of the coil of magnet 69 causes core 68 to go back into armature 70 and the concomitant displacement of pusher 63. In these conditions, thanks to truncated part 67b of its head 66, pusher 63 radially displaces mobile pin 65 in such a way that it juts out of radial hole 64.

From the opposite side to shaft 10, coupling organ 63 has a radial flange 73 (FIG. 13), against which a crown gear 74 (FIG. 7) is supported laterally, clamped axially onto driving organ 60. Crown 74 is freely mounted on the latter, whilst being able to be rotationally coupled with it by the excitation of magnet 69. It comprises at its internal periphery at least one notch 75 (visible in particular in FIG. 7) into which pin 65 can selectively penetrate by the axial displacement of pusher 63. The axial clamping of crown gear 74 is ensured by a circlip 76.

Driving organ 60 is also equipped with a gearing 77 with a rounded profile intended to ensure the angular positioning of the organ and, therefore, shaft 10. As described previously in relation to FIG. 9, shaft 10 has twelve positions so that gearing 77 has twelve cogs. A positioning roller 78 which is freely mounted at the end of a lever 79, articulated on casing 2 and biased by a spring (not shown), is permanently pressed against gearing 77.

Crown gear 74 meshes with a reducing gear (FIG. 5) formed of two cogwheels 80 and 81, one of which 80 is mounted fixed onto a transmission rod 82 and the other 81 is fixed onto the outlet rod of electric driving and control motor 13. Consequently, when the latter is supplied with power, a rotating movement is transmitted by cogwheels 80 and 81 to crown 74 which, in turn, may drive driving organ 60 and shaft 10, on condition that magnet 69 is excited (which is assumed to be the case in the drawings).

Driving organ 60 is also provided with a blind orifice 83 (FIG. 7) directed axially and opening on the side of magnet 69. Into this orifice is inserted a contact pin 84 biaised outwards by a spring 85 placed between it and the bottom of orifice 83. Thus, pin 84 is in permanent electric contact with an annular strip of electric contacts 86 (twelve in number) fixed in a separate insulating plate 87 on case 2. Electric contacts 86 are inserted, in a known manner, in an electric circuit controlling the supply of electric motor 13 to enable shaft 10 to be positioned in any possible position, selected as a function of the required transmission ratio selection. This position may thus be one of the neutral positions or one of the positions corresponding to such a ratio (see also FIG. 9).

Shaft 11 is used with a driving assembly which is very similar to that of shaft 10. Therefore only the differences between the two driving assemblies will be set out below. The similar elements have been designated in the drawings (and in particular in FIG. 7) by the same references, those used with shaft 10 having no suffix and those used with shaft 11 being provided with the suffix "a".

The differences are as follows:

path 62a does not traverse organ 60a, but is blind.

gearing 77a which enables the stable positioning of driving organ 60a, comprises only three cogs, as shaft 11 can only occupy three positions which are staggered at an angle from a position called "0" which is that in which it allows shaft 10 to control the speed ratio shifts. These three positions are indicated in FIGS. 11 and 12.

cogwheel 74a can receive its rotational power only by the instrumentality of cogwheel 74 with which it is permanently meshed.

insulating plate 87a comprises only three electric contacts 86a because shaft 11 has only three stable positions.

Part 55 of shaft 11 will now be described referring more particularly to FIGS. 4, 5 and 10. Part 55 has a general cylindrical form and has a cam groove 88 whose profile, which is described below, is shown in FIG. 11. Groove 88 co-operates with a button-shaped counter-cam 89 (FIG. 5) inserted into a radial hole 90 of the eye 91 of a reverse motion fork 92 (see also FIGS. 27 and 28).

The branches of the latter are engaged upon a reverse motion selector rod 93 which may be meshed with a gearing 94 of primary shaft 8 and with the reverse motion wheel 35 which is fixed onto secondary shaft 9. Selector rod 93 can slide axially on a pin fixed in casing 2.

The profile of cam groove 88 is shown in FIG. 11. The latter is drawn beside FIG. 12 so that one can study the angular evolution of said profile in comparison with that of the profile of cams 56, 57 and 58 which is illustrated in FIG. 12.

The most usual angular position is that which is designated, for the purposes of description, by 0° in FIGS. 11 and 12. The high part h of cams 56, 57 and 58 (FIG. 12) face counter-cams 42, 43 and 44 so that they drive them into corresponding grooves 35, 36 and 37 of shaft 10. Groove 88 starts from this angular position of 0° in a radial plane p of shaft 11.

It remains in this plane along section 88a until the 120° position where it deviates in the direction of a radial plane q which is at a distance d from radial plane p which corresponds to the lateral course of selector rod 93 and fork 91.

The 120° position corresponds to one of the particular positions of shaft 11, namely that in which shaft 10 is released by the withdrawal of counter-cams 42, 43 and 44. In this position, the lower part b of the profile of cams 56, 57 and 58 (FIG. 12) faces said counter-cams.

Beyond the 120° position, rectilinear section 88a transforms into an oblique transfer section 88b, until it reaches plane q, where the groove ends at the angular position of 260°. The latter corresponds to the third position of shaft 11 which ensures the engagement of reverse gear. In this position, the lower part of the profile of cams 56, 57 and 58 also faces counter-cams 42, 43 and 44 which thus also in this case release shaft 10.

FIGS. 10 and 17 to 25 show that each cam of cam pairs 56, 57 and 58 has an avoid form whose point exhibits a notch 96. The width 1 (FIG. 17) of this notch corresponds to the diameter d1 of snug 52 (FIG. 5B) of each counter-cam 42, 43 and 44. Further, the axial distance d2 (FIG. 10) between the cams of a same pair of shaft 11, is also equal to this diameter.

Consequently, when shaft 11 has an angular position in which the points of cams 56, 57 and 58 are respectively facing counter-cams 42, 43 and 44, the latter may move laterally to the extent that they are constrained by the high parts 41 of the profile of grooves 35, 36 and 37 of shaft 10. This lateral displacement causes the displacement of corresponding fork 29, 30 or 31 and also that of corresponding selector rod 26, 27 or 28, which enables the necessary speed ratio to be selectively engaged.

During the rotation of shaft 11, shoulder 51 of each counter-cam is maintained pressed against the surface of the two corresponding cams, whilst snug 52 circulates in the space arranged between said cams (distance d2). Thus, the counter-cams are always suitably driven, whatever the movements of the two shafts.

Figure 6:
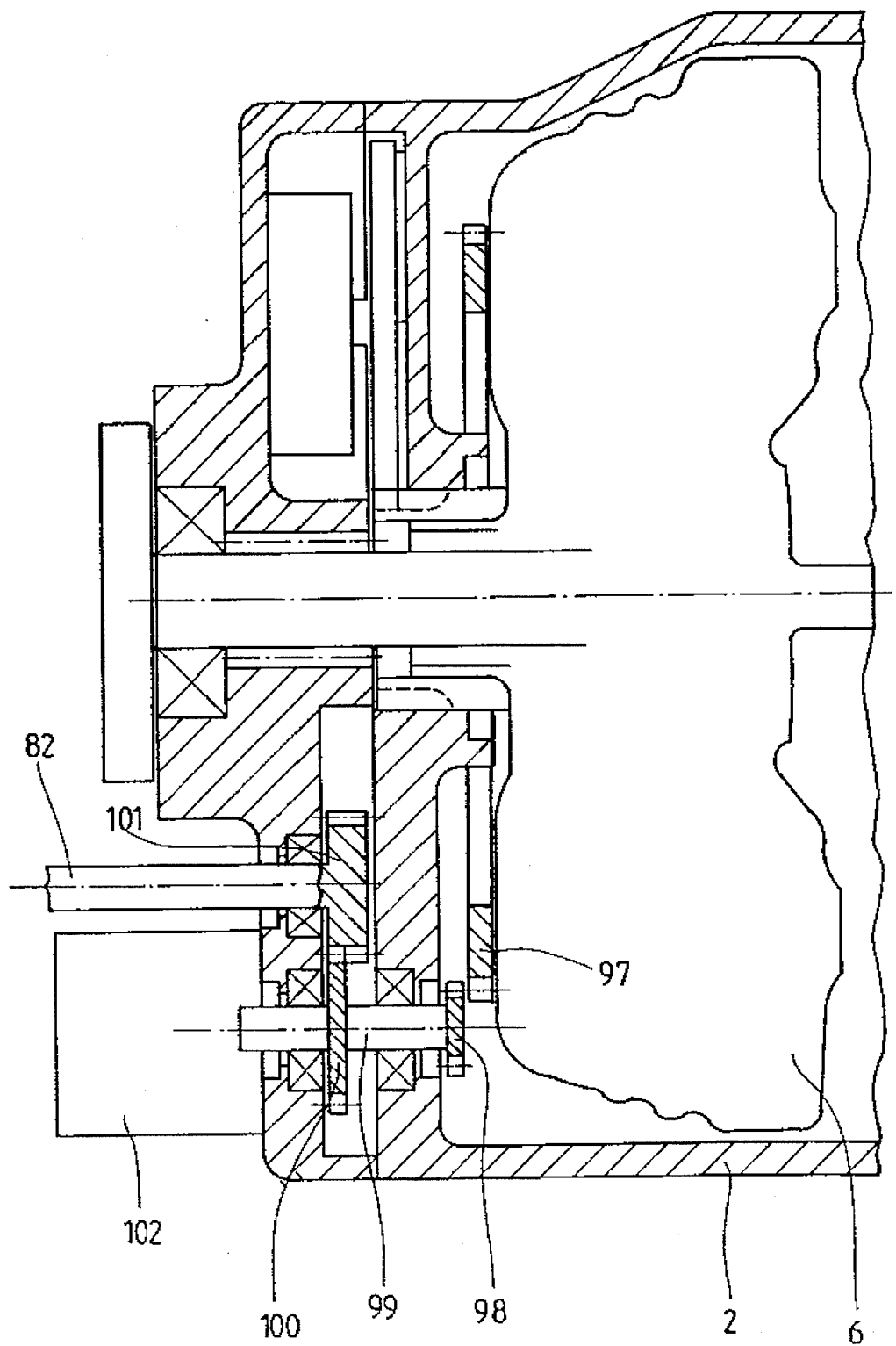
FIG. 6 is a cross-sectional view, to an even larger scale than that of FIGS. 4 and 5, of the starter mechanism of the internal combustion engine to which the gearbox according to the invention may be coupled.

Referring to FIGS. 5 and 6, the starter mechanism of the driving motor symbolized by the box 3 in FIGS. 1 and 2 will now be described. In the conventional manner, converter 6 has a crown gear 97 capable of meshing with a starting pinion 98 mounted on a pin 99 pivoting in casing 2. This pin 99 carries a cogwheel 100 meshing with a pignon 101 which is mounted fixed onto transmission rod 82.

Pin 99 is mounted so as to slide axially in its bearings and can occupy a non-active position (shown in FIG. 6) and an active starting position which may be obtained by the excitation of a magnet 102. In this position, pignon 98 meshes with crown 97.

It is thus noted that, according to an advantageous characteristic of the invention, motor 13 not only ensures the control of shafts 10 and 11, but it also is used as starter motor for the internal combustion engine which will be coupled to the gearbox according to the invention.

Referring now to FIGS. 17 to 25 a few examples of the operational phases of the gearbox according to the invention will be described, observing in particular, in each case, the relative position of shafts 10 and 11.

1. Shift into the fifth neutral gear

Let us assume that the gearbox has just come out of fourth gear and that it has to shift into fifth. In coming out of fourth, the gearbox has reached the neutral position between fourth and fifth (neutral 4/5), which is that shown in FIGS. 17 and 18.

It should be noted that each gear shift requires the activation of clutch 7 in order to disengage the gearbox from the power supply which is engine 3, which is well known and thus does not require any particular description.

Fifth gear is engaged, when selector rod 26 is displaced to mesh with wheel 103 (FIG. 4) which is freely mounted on primary shaft 8 and meshes with selector rod 27 fixed onto secondary shaft 9 (displacement towards the left of selector rod 26 as seen in FIG. 4). For this to happen, fork 29 must be displaced in the same direction, an operation which is achieved by the displacement, still in the same direction, of counter-cam 42 which follows the profile of groove 35. FIG. 9 shows counter-cams 42, 43 and 44 in the neutral position between fourth and fifth. It is thus fitting that they shift into the fifth position, which corresponds to a 30° rotation of shaft 10.

In FIG. 9, it can be seen that during this rotation, the axial position of counter-cams 43 and 44 does not change, whereas counter-cam 42 is constrained to follow the deviation of groove 35.

In other words, to obtain the shift into fifth gear, motor 13 must turn over for a brief moment during which magnet 69 is excited, so that the shaft can effect the required 30° rotation. The result of these successive operations is shown in FIGS. 19 and 20. It should be noted that shaft 11 has remained immobile during this gear shift, snug 52 of counter-cam 42 having been able to fit into groove 96 of the left cam of cam pair 57 (as seen in FIG. 10). This is clearly visible in FIG. 20.

Shaft 11 remaining immobile, the gear shift can only be progressive, that is to say that to shift up or down the gears, it is necessary to pass through all the imtermediate gears.

The rotation of shaft 11 from the position shown in FIGS. 17 and 19, enables the mechanical coupling between the shaft and the forks to be cut out. In other words, shaft 10 can then be turned freely and placed in any angular position which means that any speed ratio may be freely selected as required whatever the speed ratio previously engaged.

2. Shift from fifth into second

Returning to the operating examples in FIGS. 17 to 25, let us assume that after having operated for a certain period of time in fifth gear, one wishes to shift down into second gear.

It is clear that without the presence of shaft 11 and the organs with which it is used, one would have to shift down by passing through all the gears from fifth to second, that is to say to displace the forks, selector rods etc., in order to make them carry out movements which are perfectly useless for the gear shift which one wishes to make.

Thanks to the invention, one can shift directly from fifth to second gear (or carry out any other shift), by returning shaft 10 to a neutral position, (advantageously the position in FIG. 17 which is neutral position 4/5), and then releasing shaft 10 by rotating shaft 11.

The first operation brings counter-cam 42 back in front of the groove between the two cams 56, which then enables the rotation of shaft 11, thanks to the fact that snug 52 can then insert iteself between said cams.

The second operation causes shaft 11 to turn 120°. As the three counter-cams 42, 43 and 44 follow the profile of their associated counterpart cams 56, 57 and 58, they are displaced radially outwards by the action of respective springs 48. At the same time they leave the respective grooves of shaft 10, which enables the latter to turn freely.

It is thus clear that the rotation of the two shafts 10 and 11 is, each time, ensured by motor 13, the gearings used with it, contacts 86 and magnets 69 and 69*a* which are selectively excited during the time required to carry out the proper rotations of the two shafts.

Figure 21:
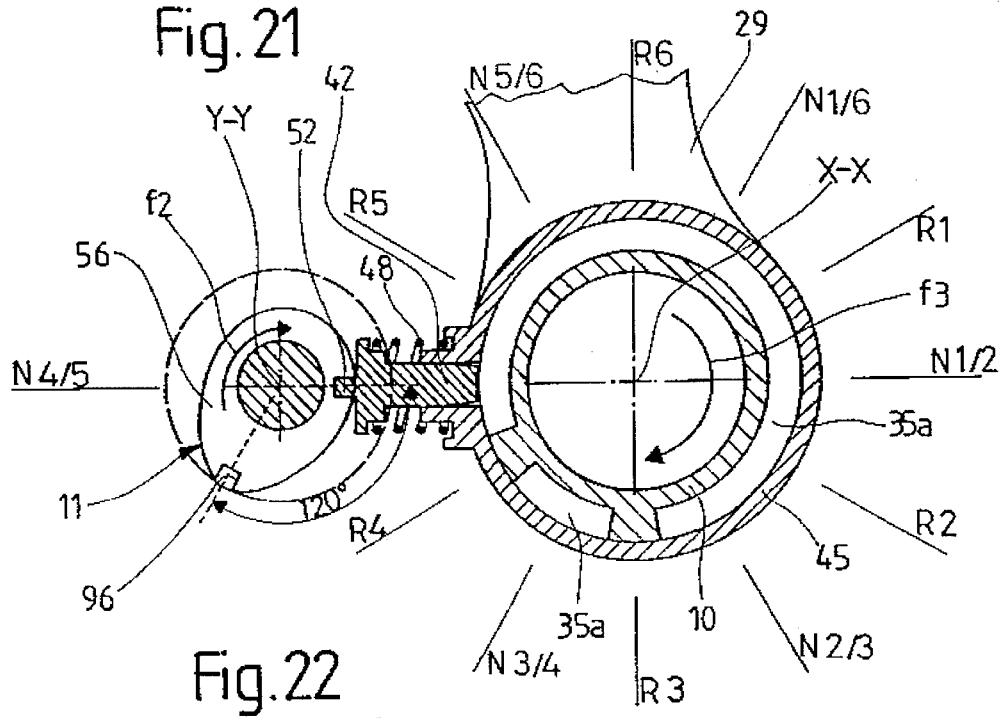
Figure 22:
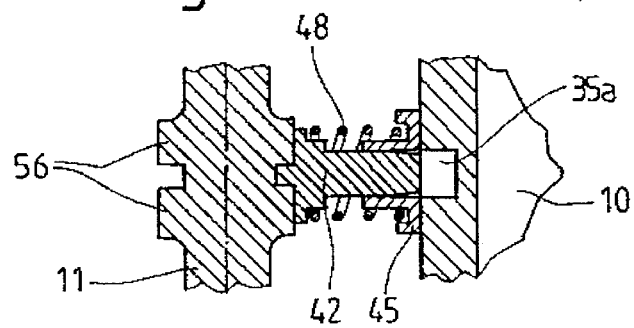
Figure 23:
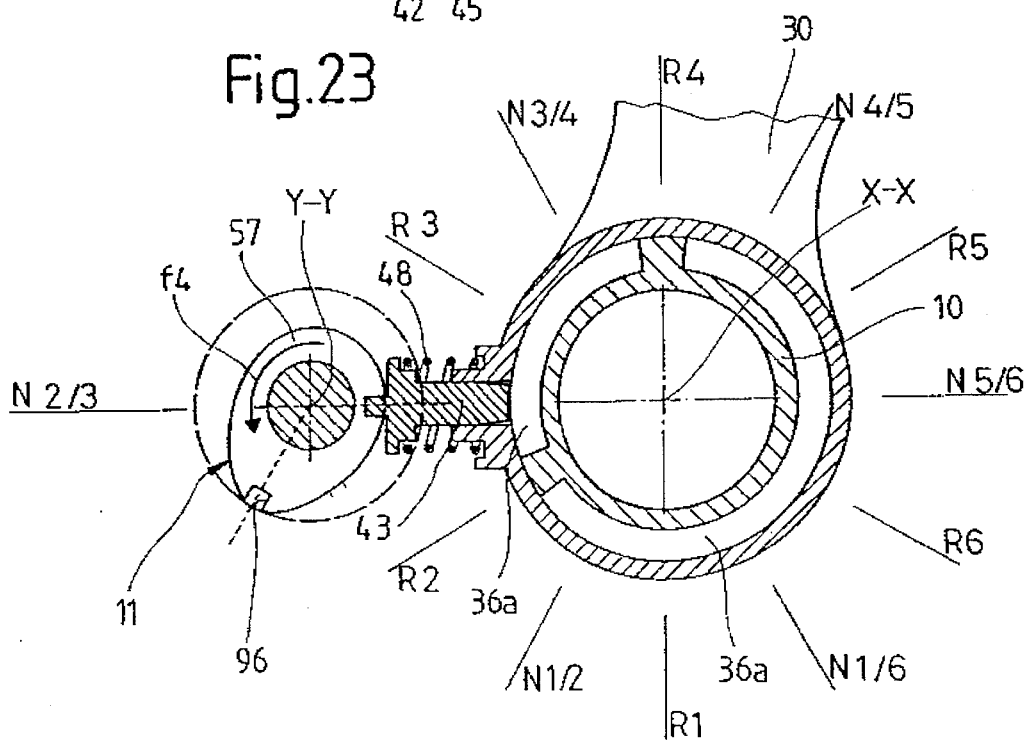
Figure 24:
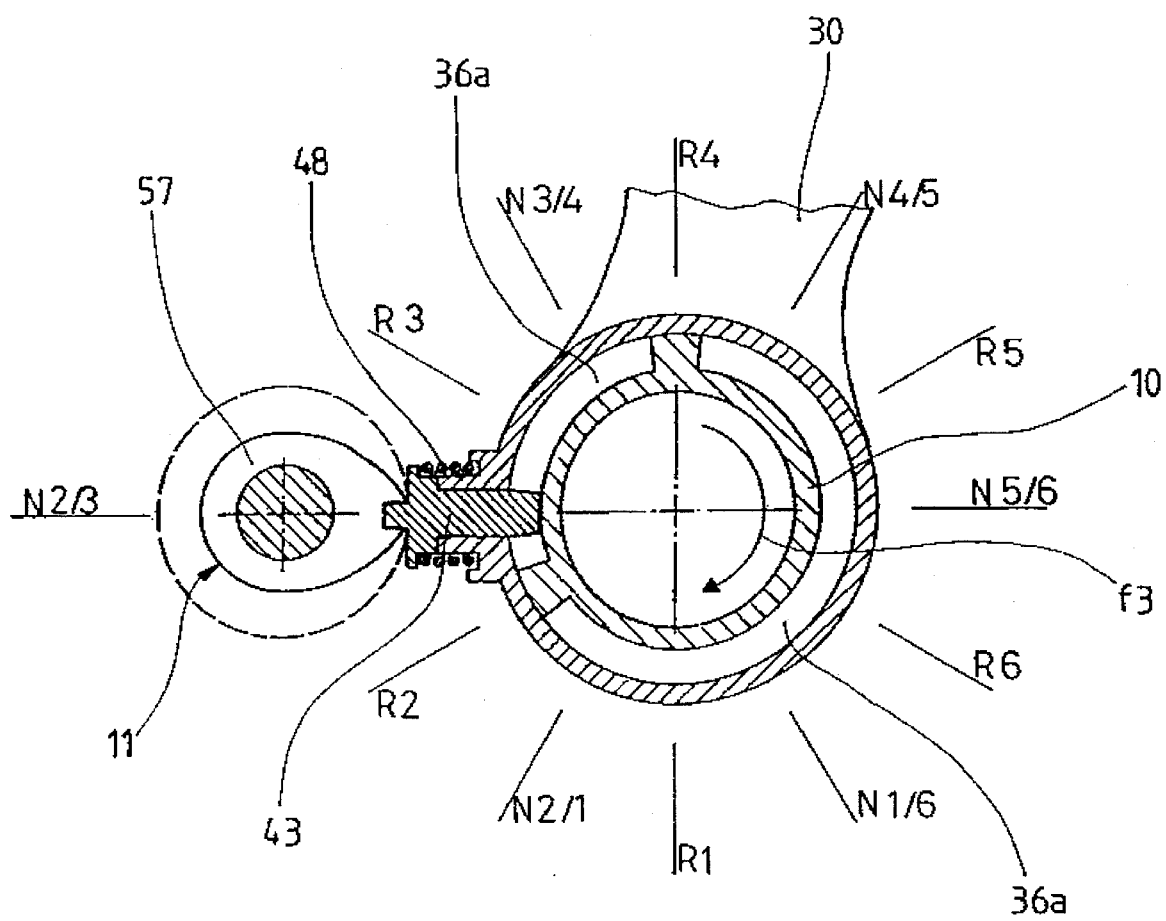
Figure 25:
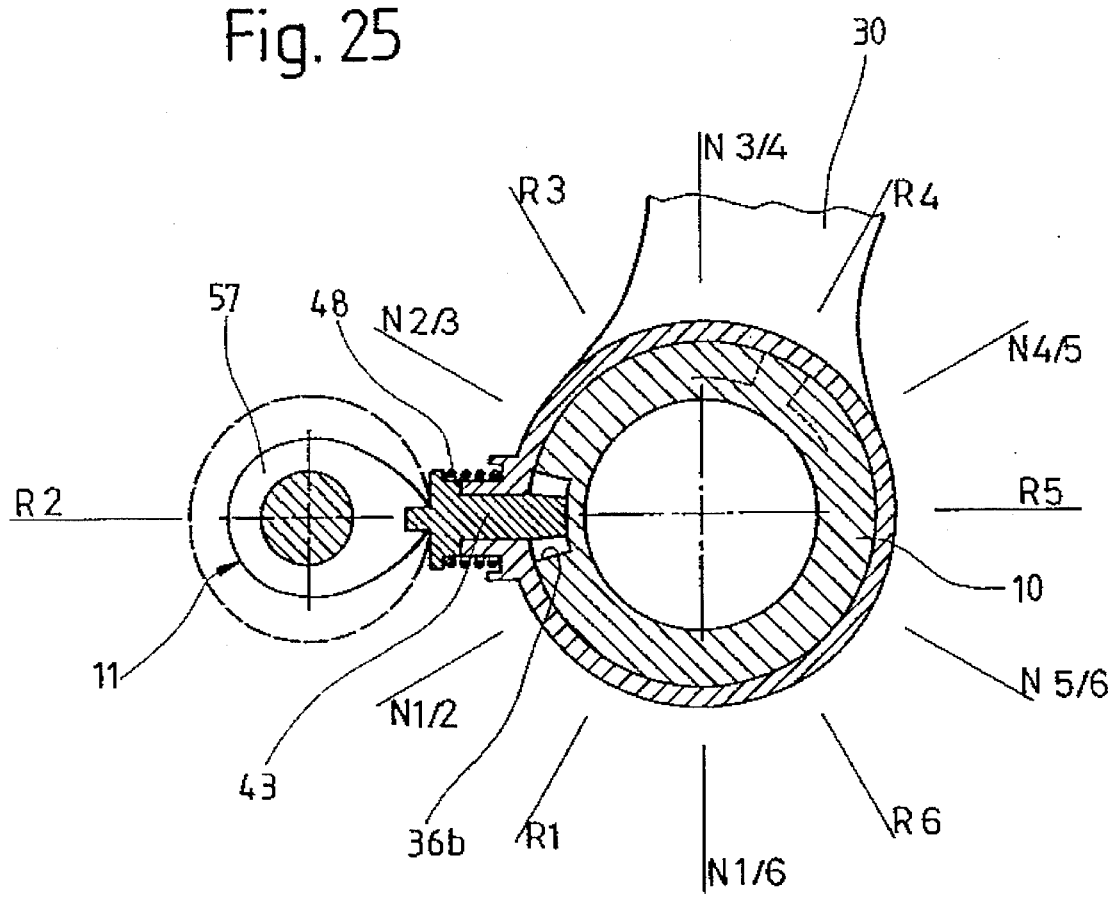

Shaft 10 is then brought into neutral position 2/3 as shown in FIG. 23 by causing it to turn in the direction of the arrow f3 shown in FIGS. 9 and 21.

FIG. 23 shows a cross-sectional view at the level of the axis Z—Z of counter-cam 43 and one can thus see groove 36 of shaft 10, fork 30, counter-cam 43 and cams 57 of shaft 11.

Then, shaft 11 is returned to the 0° position by causing it to turn in the direction of the arrow f4 (FIGS. 11 and 23), a position which is shown in FIG. 4 and in which notches 96 are again facing snugs 52 of counter-cams 42, 43 and 44.

Next, shaft 10 is turned a further 30° in the direction of arrow f3 to drive-off to the left counter-cam 43, which displaces fork 30 and selector rod 27 in the same direction. Second gear is then engaged. The two shafts are in the relative position shown in FIG. 25.

3. Shift into reverse gear

Figure 26:
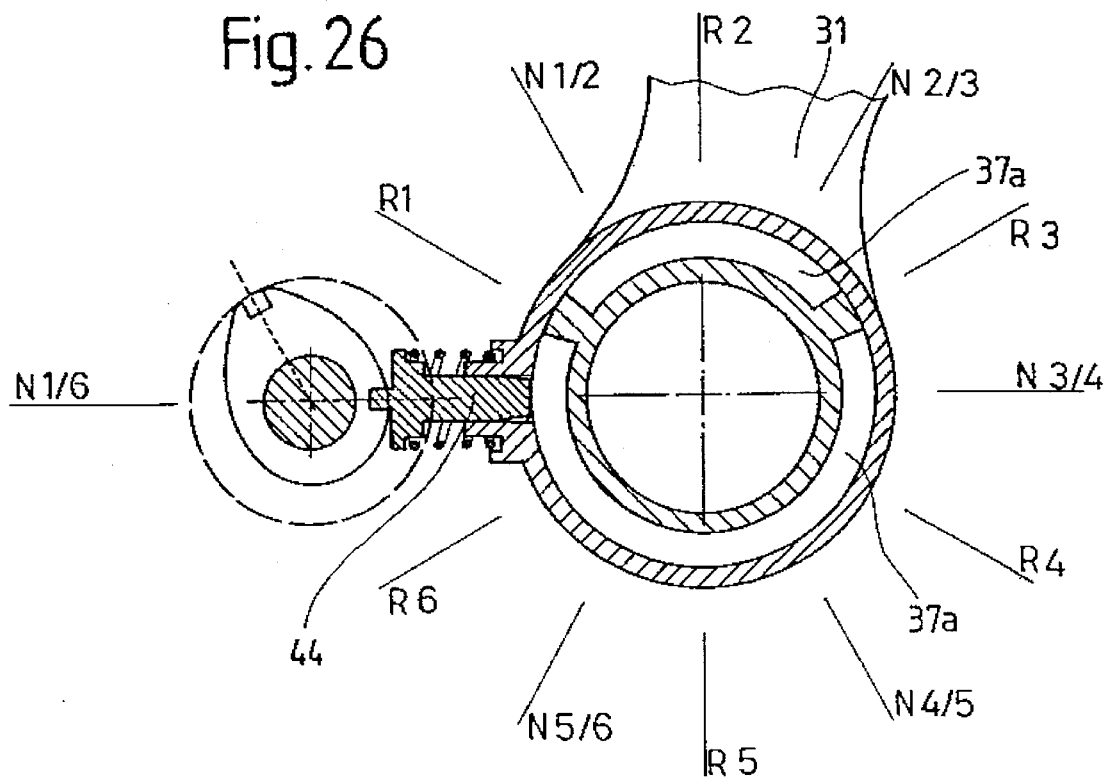
FIGS. 26, 27, and 28 illustrate the operation of the gearbox when reverse gear is selected.
Figure 27:
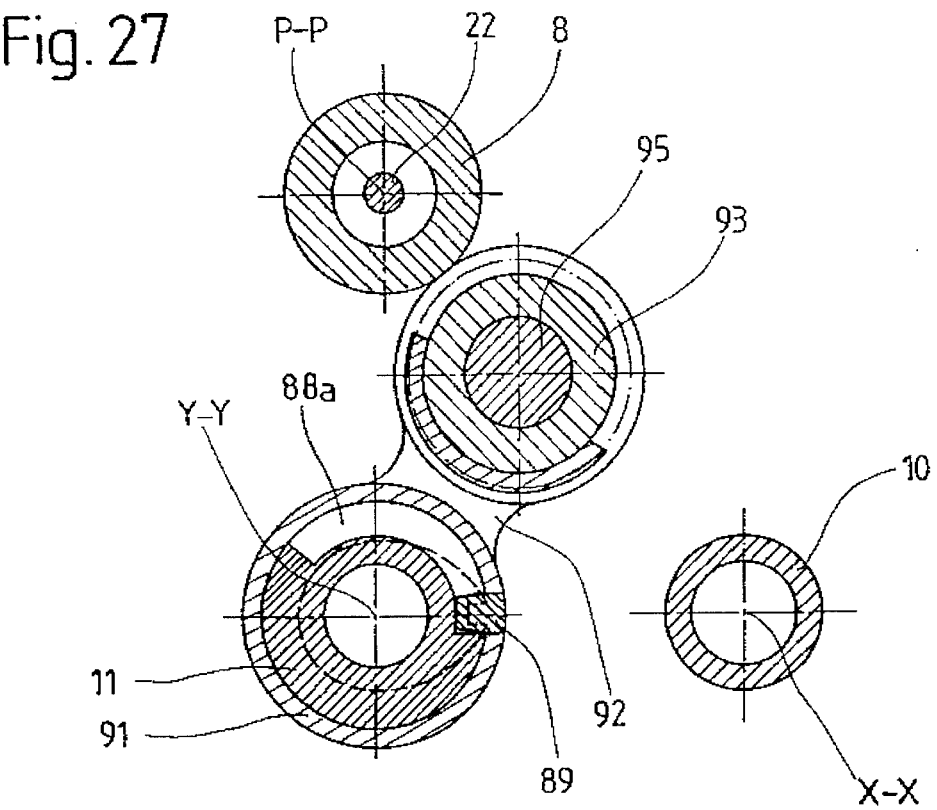
Figure 28:
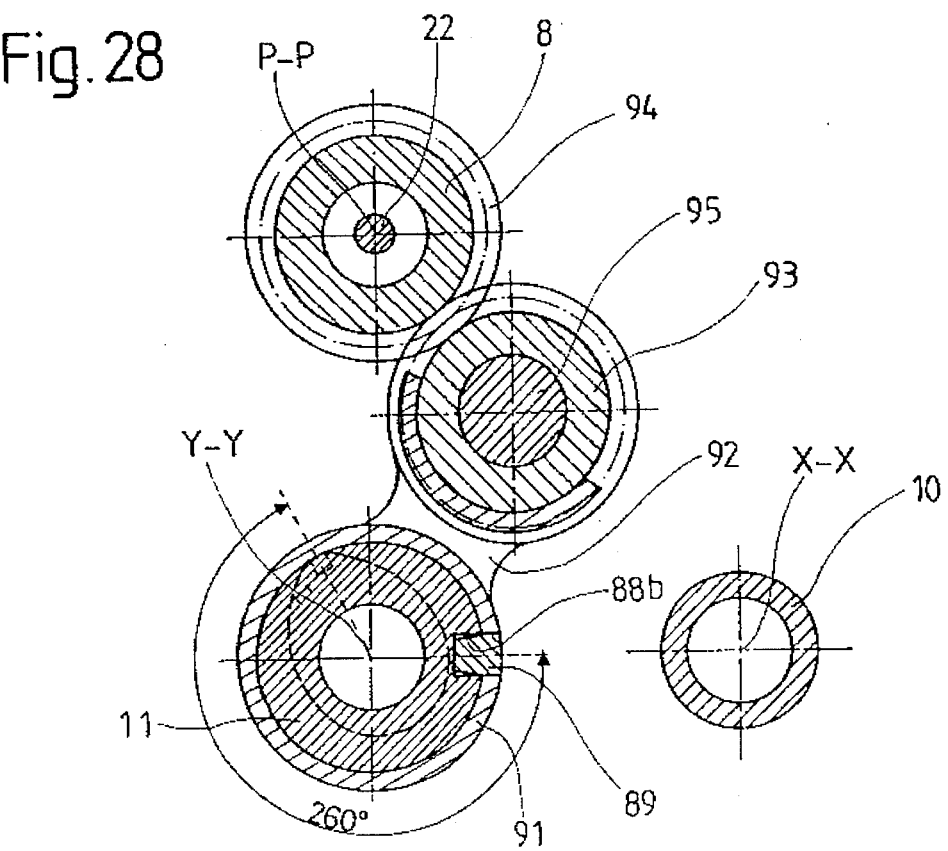

FIGS. 26, 27 and 28 illustrate the engaging of reverse gear. When reverse is selected, gearbox 1 is first placed in neutral position 1/6 according to a procedure similar to that which has just been described. Then, shaft 11 is driven by rotation in the direction of the arrow f4 of FIG. 11, at an angle of rotation of 260°.

These operations are translated by the relative position of shafts 10 and 11 as illustrated in FIG. 26. It should be noted that this figure is a cross-sectional view along axis Z—Z of counter-cam 44.

FIG. 27 shows the position of the organs associated with engaging reverse gear before this engaging is achieved and FIG. 28 shows them in their reverse positions, this drawing thus corresponding to the situation such as that shown in FIG. 26.

When reverse gear is not engaged, that is to say as long as counter-cam 89 circulates in section 88*a* of groove 88 of shaft 11 or is immobile at the ends of this section, reverse fork 92 and pignon 93 maintain the axial position shown in FIGS. 2 and 5. This of course applies for neutral position 1/6 of the gearbox, which is the case in shaft 11 is situated in the position shown in FIG. 27 in which the points of cams 56, 57 and 58 are facing counter-cams 42, 43 and 44.

It can thus be seen that to shift into reverse, it is advisable to control shaft 11 in such a way that it turns 260° so that counter-cam 89 arrives at the end of groove 88. It should be noted that in these conditions, counter-cams 42, 43 and 44 are disengaged from shaft 10 so that no forward gear can then be selected.

Counter-cam 89 being constrained to move to its position corresponding to plane q (FIG. 11), that is to say towards the left as seen in the drawings, fork 92 moves in the same direction bringing with it the reverse pignon which thus comes to be interposed between gearing 95 of shaft 9 and the reverse pignon of shaft 8.

To return to forward gear, the operations are executed in reverse, in order to bring the gearbox back into neutral position 1/6.

We claim:

1. Gearbox comprising:

a primary shaft (8) intended to be coupled to a power supply (3, 6);

a secondary shaft (9) intended to be coupled to a power outlet (4, 5);

a plurality of sets of gearwheels mounted on said primary (8) and secondary (9) shafts, said sets of gearwheels being able to be selectively meshed to establish a plurality of transmission ratios between said supply (3, 6) and said outlet (4, 5);

said sets of gearwheels comprising a plurality of switching gearwheels (26, 27, 28) for said ratios, these gearwheels being mounted so as to move axially on said shafts (8, 9) to enable said ratios to be established;

selection means (10 to 13; 29, 30, 31; 35, 36, 37; 42, 43, 44) coupled to said switching gearwheels (26, 27, 28) to cause them to make the appropriate axial movements according to the desired transmission ratio;

said selection means (10, 12, 13) comprising a ratio selector shaft (10) rotationally mounted so as to be able to have at least as many selection positions as there are possible transmission ratios, said selector shaft (10) being therefore provided with cam forming means (35, 36, 37) coupled to said switching gearwheels (26, 27, 28) through the intermediary of counter-cam forming means (42, 43, 44);

said gearbox being characterised in that it also comprises decoupling means (11, 12, 13; 57, 57, 58) for selectively disabling the coupling between each cam forming means (35, 36, 37) and each counter-cam forming means (42, 43, 44) associated with it, in order to enable the free rotation of said selector shaft (10) towards any ratio selection position, whatever the previously selected transmission ratio.

2. Gearbox according to claim 1 characterised in that it also comprises motor means (12, 13) to ensure automatic control of said selector shaft (10) and said decoupling means (11, 12, 13; 56, 57, 58).

3. Gearbox according to claim 1, characterised in that said decoupling means comprise a decoupling shaft (11) rotationally mounted parallel to said selector shaft (10), said decoupling shaft being equipped with at least one cam (56, 57, 58) per counter-cam forming means (42, 43, 44) which said selector shaft (10) has, each of said decoupling cams (56, 57, 58) being mounted in such a way that they are able to disengage said counter-cam forming means (42, 43, 44) from its associated cam forming means (35, 36, 37).

4. Gearbox according to claim 3, characterised in that said decoupling shaft (11) is provided with means for controlling the shift into reverse (88, 89), the gearbox (1) also comprising reverse gearwheels (MA, 94) used with said primary (8) and secondary (9) shafts and reverse switching gearwheels (93) mounted so as to be able to be controlled by said reverse shift control means (88, 89).

5. Gearbox according to claim 1 characterised in that said cam forming means are annular grooves (35, 36, 37) of predetermined profile arranged in the peripheral surface of said selector shaft (10).

6. Gearbox according to claim 5, characterised in that each of the switching gearwheels (26, 27, 28) is intended to engage two transmission ratios, in that it is therefore mounted so as to move axially in both directions, respectively on the primary (8) and secondary (9) shafts, and in that each cam groove (35, 36, 37) of said selector shaft (10) comprises two deviation portions (35b, 36b, 37b) extending in opposite axial directions, such deviations enabling the corresponding gearwheels to be placed in each of its ratio engaging positions.

7. Gearbox according to claim 6, characterised in that it comprises six transmission ratios and in that all the deviation portions are staggered in relation to each other at an angle of 60°.

8. Gearbox according to claim 4, further comprising motor means, said motor means comprising a single driving motor (13) at the shaft outlet of which are connected two electromagnetically controlled coupling mechanisms (60, 63, 69; 60a, 63a, 69a) enabling the selective coupling of the selector shaft (10) and the decoupling shaft (11) to the outlet shaft of said single motor (13) to enable them to be placed in predetermined angular positions.

9. Gearbox according to claim 3, characterised in that said decoupling shaft (11) comprises, for each of said counter-cams (42, 43, 44), at least one cam (56, 57, 58) of ovoid form, angularly oriented in the same position and defining by its point a first position (0°) in which these cams maintain said counter-cams (42, 43, 44) in their engaged position with the selector shaft (10), said ovoid-shaped cams defining by their profile two other angular positions (120° and 260°) of said decoupling shaft, in one of which said counter-cams are withdrawn from their engaged position with the selector shaft (10) and the other in which reverse gear is engaged.

10. Power unit intended more particularly to equip a motor vehicle and comprising, in combination, a driving motor (3), a gearbox according to claim 1, said gearbox (1) being coupled to said driving motor (3), the unit also comprising a starter mechanism (13, 87 to 102), equipped with a starter motor (13), this power unit being characterised in that said starter motor (13) is coupled so as to be able to start selectively said driving motor (3) and to be used as driving organ for said selector shaft (10) and for said decoupling means (11, 12; 56, 57, 58).

11. Unit according to claim 10, characterised in that a torque converter (6) is interposed between said gearbox (1) and said driving motor (3).

* * * * *